(12) United States Patent
Power et al.

(10) Patent No.: US 8,827,015 B2
(45) Date of Patent: Sep. 9, 2014

(54) SPINDLE AND BRAKE ATTACHMENT MEMBER FOR A VEHICLE

(75) Inventors: Michael A. Power, Troy, MI (US); Gregory D. Pavuk, Berkley, MI (US); Sunil Shastri, Karnataka (IN)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/280,398

(22) Filed: Oct. 25, 2011

(65) Prior Publication Data

US 2013/0098697 A1    Apr. 25, 2013

(51) Int. Cl.
| | | |
|---|---|---|
| *A01B 71/06* | (2006.01) | |
| *B60B 37/00* | (2006.01) | |
| *B60B 35/04* | (2006.01) | |
| *B60B 35/00* | (2006.01) | |
| *B60B 35/02* | (2006.01) | |
| *B60B 35/12* | (2006.01) | |
| *B62D 53/00* | (2006.01) | |

(52) U.S. Cl.
CPC ............... *B60B 35/00* (2013.01); *B60B 37/00* (2013.01); *B60B 35/04* (2013.01); *B60B 2900/541* (2013.01); *B60B 35/02* (2013.01); *B60B 35/12* (2013.01); *B62D 53/00* (2013.01)
USPC ....... 180/14.1; 301/124.1; 301/125; 301/126; 301/127; 301/132

(58) Field of Classification Search
USPC ............ 301/124.1, 125, 126, 127, 131, 132; 180/14.1
See application file for complete search history.

(56) References Cited

U.S. PATENT DOCUMENTS

| | | | | |
|---|---|---|---|---|
| 2,501,579 | A * | 3/1950 | Pointer | ............... 188/206 R |
| 3,666,061 | A | 5/1972 | Nehr | |
| 4,828,328 | A * | 5/1989 | Bowman | ............... 301/130 |
| 5,123,669 | A * | 6/1992 | Ducote | ............... 280/426 |
| 5,277,450 | A * | 1/1994 | Henschen | ............... 280/6.151 |
| 5,325,945 | A | 7/1994 | Walker | |
| 5,435,793 | A | 7/1995 | Varela et al. | |
| 5,477,937 | A * | 12/1995 | Chagnon | ............... 180/24.01 |
| 5,772,285 | A * | 6/1998 | Bigley et al. | ............... 301/6.8 |
| 6,273,446 | B1* | 8/2001 | Paul | ............... 280/448 |
| 6,299,259 | B1* | 10/2001 | MacKarvich | ............... 301/127 |
| 6,431,659 | B1* | 8/2002 | Somppi | ............... 301/132 |
| 6,447,073 | B1* | 9/2002 | Goettker | ............... 301/127 |
| 6,626,454 | B1 | 9/2003 | Power et al. | |
| 6,666,474 | B2 | 12/2003 | Pavuk | |
| 6,701,763 | B2 | 3/2004 | Varela | |
| 6,926,371 | B1* | 8/2005 | Gagnon | ............... 301/132 |
| 6,929,084 | B2 | 8/2005 | Pavuk | |
| 6,962,242 | B2 | 11/2005 | Conti | |

(Continued)

OTHER PUBLICATIONS

ArvinMeritor Maintenance Manual 4 (Revised Mar. 2011).

(Continued)

*Primary Examiner* — Joseph M Rocca
*Assistant Examiner* — Marlon Arce
(74) *Attorney, Agent, or Firm* — Brooks Kushman P.C.

(57) ABSTRACT

A wheel assembly includes an attachment member with a spindle attachment interface and a brake attachment interface. A spindle is attached to the spindle attachment interface and a brake component is attached to the brake attachment interface. The spindle attachment interface is configured to be a detachable connection that allows the spindle to be selectively attached and detached from the wheel assembly.

8 Claims, 10 Drawing Sheets

(56) References Cited

U.S. PATENT DOCUMENTS

| | | | |
|---|---|---|---|
| 7,234,783 B2 * | 6/2007 | MacKarvich | 301/132 |
| 7,475,893 B2 | 1/2009 | Chamberlin et al. | |
| 8,276,925 B2 * | 10/2012 | Varela et al. | 280/93.512 |
| 2006/0001311 A1 | 1/2006 | Platner et al. | |
| 2006/0001312 A1 * | 1/2006 | MacKarvich | 301/124.1 |
| 2006/0261570 A1 | 11/2006 | Eshelman et al. | |
| 2010/0276904 A1 | 11/2010 | Pavuk | |

OTHER PUBLICATIONS

Meritor Wedge Brakes Maintenance Manual 4R, revised Feb. 1995.
Meritor Maintenance Manual MM-09168—Heavy-Duty Single Rear Drive Axles for Port/Terminal Tractors, issued Nov. 2010.

* cited by examiner

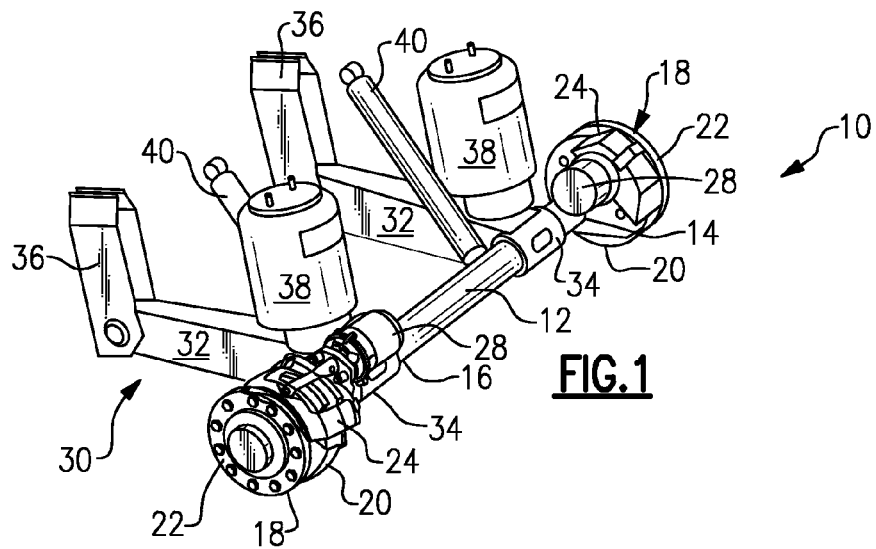
FIG.1
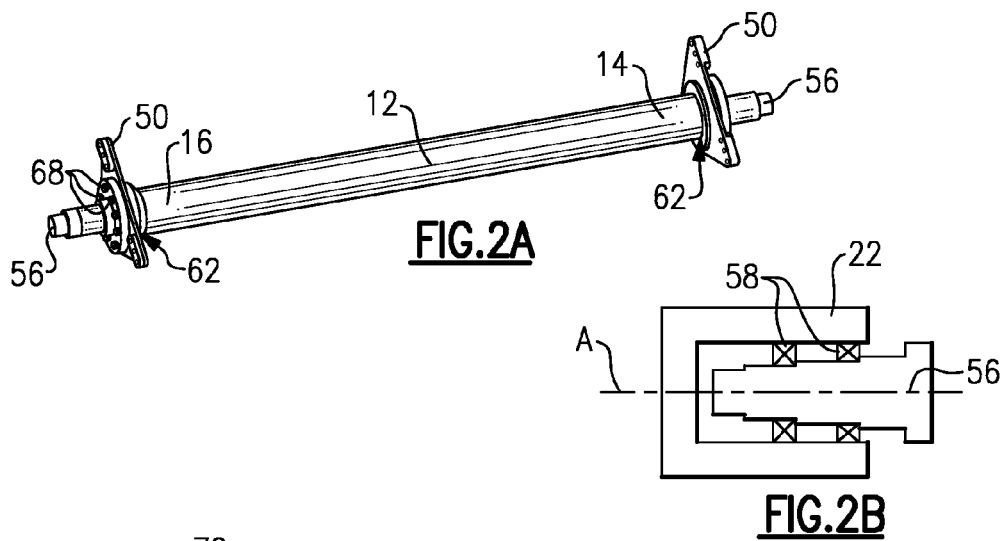
FIG.2A
FIG.2B
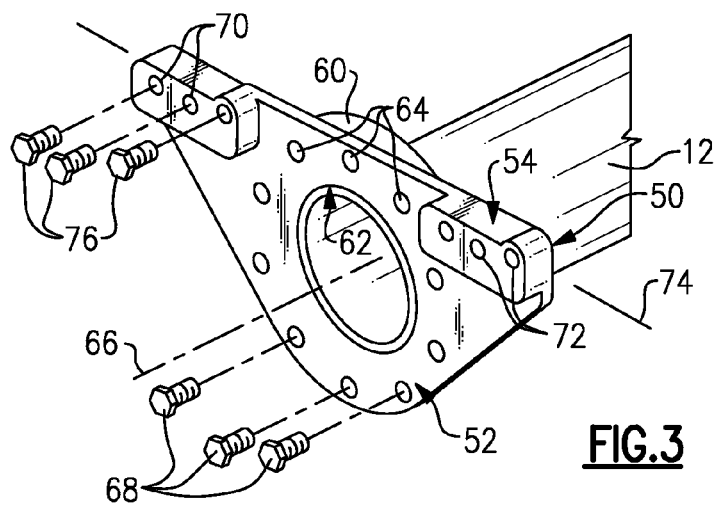
FIG.3

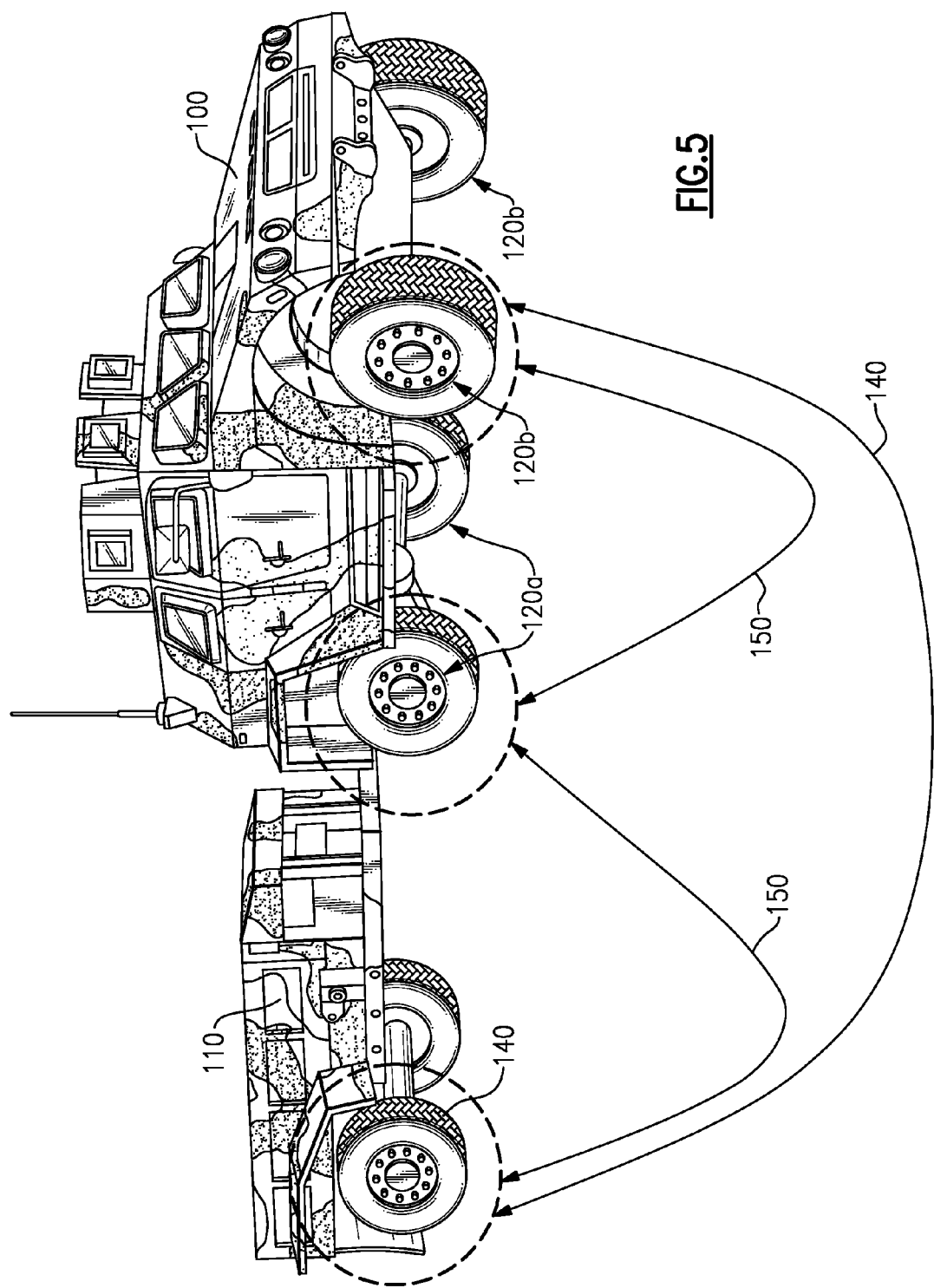

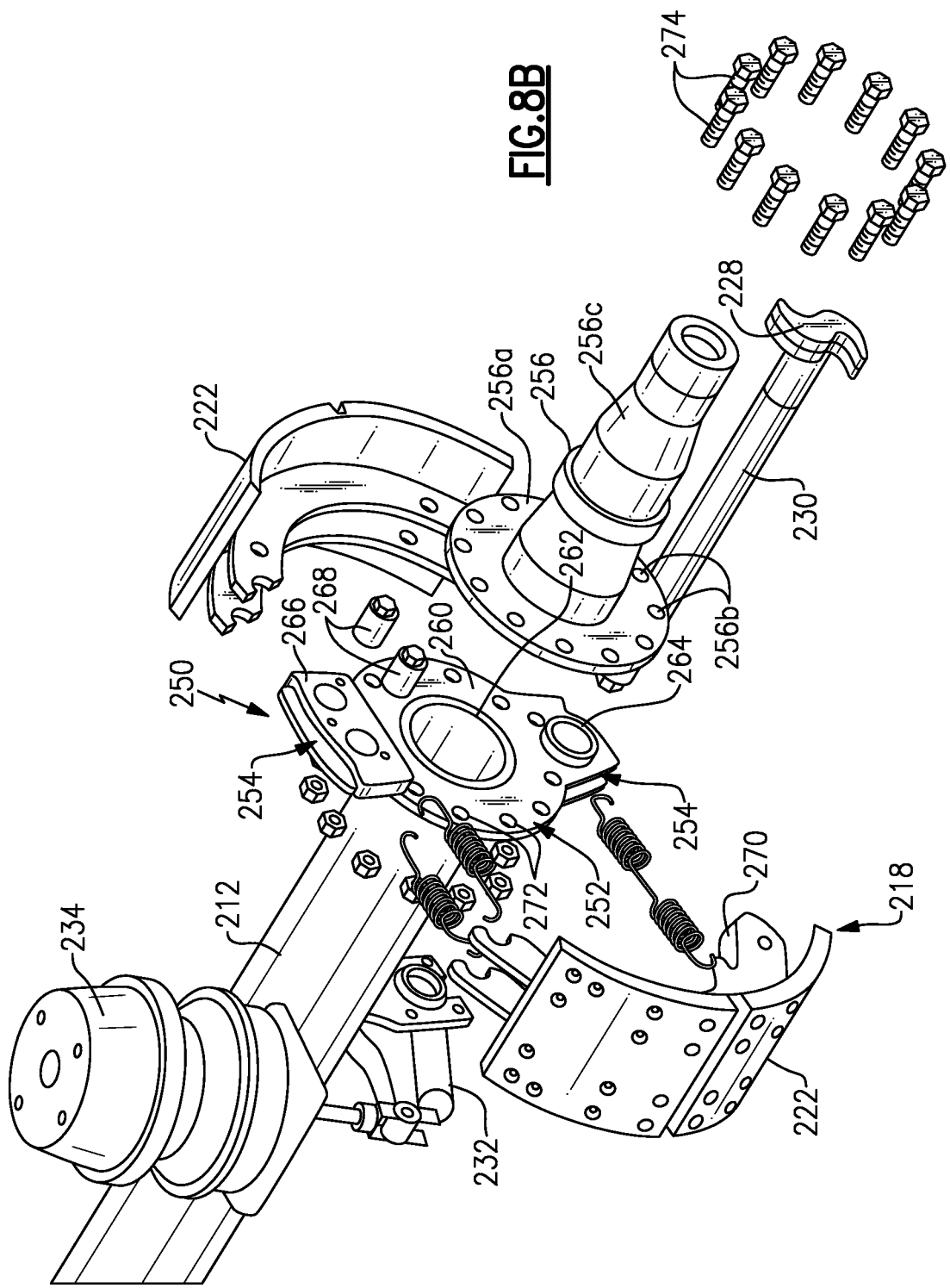

SPINDLE AND BRAKE ATTACHMENT MEMBER FOR A VEHICLE

TECHNICAL FIELD

This invention generally relates to a wheel assembly having an attachment member that includes spindle and brake attachment interfaces.

BACKGROUND OF THE INVENTION

Rigid axles have an axle tube or housing with a permanently attached spindle at each end that supports an associated wheel. The axle also includes a brake assembly that is associated with each wheel. The brake assembly is attached to the axle at a location near the spindle attachment. Such an axle can be used as a trailer axle in military applications, for example, where vehicles operate in remote locations under harsh conditions. If the spindle becomes damaged, the spindle cannot be easily repaired or readily replaced as the spindle is a permanent part of the axle. An additional complication is provided by the brake assemblies which must also be securely attached to the axle near the spindle locations within a tight packaging envelope.

SUMMARY OF THE INVENTION

A spindle for a wheel assembly is configured for attachment to an attachment member. The attachment member includes a spindle attachment interface and a brake attachment interface. In one example, the spindle is attached to the attachment member at the spindle attachment interface to provide a selectively detachable connection.

In one example, a vehicle includes a prime mover unit with at least one prime mover wheel assembly and a trailer unit with at least one trailer wheel assembly. The prime mover wheel assembly has a prime mover spindle and the trailer wheel assembly has a trailer spindle. The trailer spindle is configured to be detachable from the trailer wheel assembly and attached to the prime mover wheel assembly.

These and other features of the present invention can be best understood from the following specification and drawings, the following of which is a brief description.

BRIEF DESCRIPTION OF THE DRAWINGS

FIG. 1 is a perspective view of a rigid axle assembly utilizing an attachment member to provide a serviceable spindle with a brake assembly.

FIG. 2A is a perspective view of an axle tube, the attachment members, and the spindles.

FIG. 2B is a schematic representation of a wheel hub rotatably supported on a spindle via bearings.

FIG. 3 is a magnified view of one end of the axle tube with the attachment member.

FIG. 5 is a perspective view of a vehicle comprising a prime mover unit and trailer unit, and which shows spindle interchangeability in multiple locations.

FIG. 8B shows an exploded view of one end of the axle assembly of FIG. 8A, as looking at an outboard face of the attachment member.

DETAILED DESCRIPTION

Figure 4:
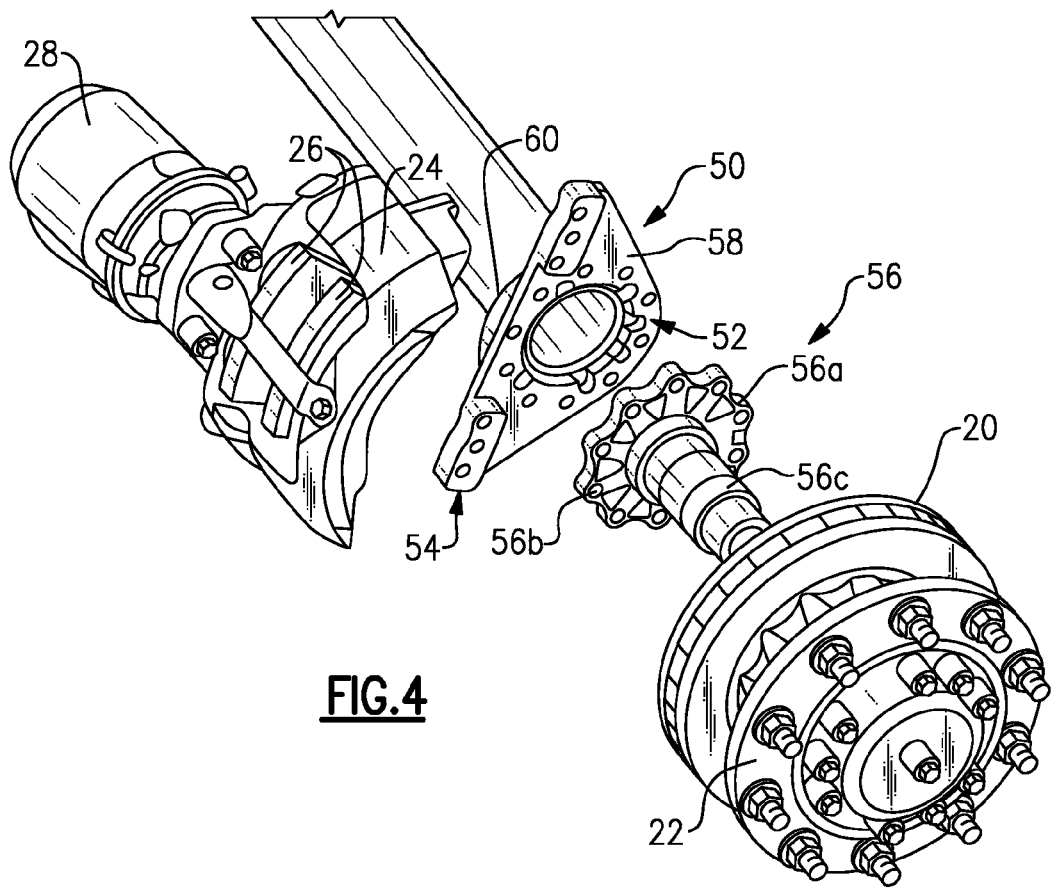
FIG. 4 is an exploded view of one end of the rigid axle assembly of FIG. 1 showing a disc brake assembly.

As shown in FIG. 1, a rigid axle assembly 10 includes an axle housing or tube 12 having a first end 14 and a second end 16 that each support a brake assembly 18. In the example shown in FIG. 1, the brake assembly 18 comprises a disc brake having a rotor 20 that rotates with a wheel hub 22 and a caliper 24 that includes a pair of brake pads 26 (FIG. 4) that engage the rotor 20 to perform a braking operation. An actuator including air chambers 28 is used to move the pads 26 into engagement with the rotor 20 as known.

The rigid axle assembly 10 also includes a suspension system 30 that connects the rigid axle assembly 10 to a structure such as a frame or chassis. In one example, the suspension system 30 includes suspension arms 32 that have one end connected to the axle tube 12 via an axle wrap 34 and an opposite end connected to the structure via a bracket assembly 36. In the example shown, the suspension system 30 also includes air springs 38 and shock absorbers 40. The suspension shown in FIG. 1 is simply one example of a suspension, it should be understood that other types of suspensions could also be used.

In one example, the axle assembly 10 of FIG. 1 comprises a trailer axle where the suspension 30 connects the axle tube 12 to a trailer frame. The axle tube 12 is shown in greater detail in FIG. 2A. Each of the first 14 and second 16 ends includes an attachment member 50. As shown in FIG. 3, attachment member 50 comprises a one-piece flange that includes a spindle attachment interface 52 and a brake attachment interface 54. Spindles 56 (FIGS. 2A-2B) are attached to the spindle attachment interface 52. As schematically shown in FIG. 2B, the spindle 56 supports the wheel hub 22 for rotation about axis A on bearings 58 mounted between the spindle 56 and associated wheel hub 22. This forms part of a wheel assembly that is mounted to each end of the axle housing or tube 12. As known, a rim and tire assembly is mounted for rotation with the wheel hubs at each end.

A non-rotating brake component from the brake assembly 18 is attached to the brake attachment interface 54 of the attachment member 50. In the example shown in FIG. 4, the non-rotating brake component comprises the brake caliper 24 that supports the brake pads 26.

The non-rotating brake components and the spindles are separately and independently detachable/attachable to the attachment member 50. As such, attachment interfaces 52, 54 each comprise independent connections that allow a respective spindle 56 and/or the caliper 24 to be selectively attached and detached from the associated attachment member 50.

This significantly improves maintenance and repair operations as spindles can be easily replaced without having to replace an entire axle assembly. Further, as will be discussed in greater detail below, the spindles can be detached from one location on a vehicle and be used at another location on the vehicle as needed. The capability of independent removal of the non-rotating brake component from the attachment member 50 further facilitates removal of the associated spindle 56.

As shown in FIGS. 3-4, the axle tube 12 comprises a hollow cylindrical body. In one example, the attachment member 50 comprises a flange that is welded to the first 14 and second 16 ends. In the example shown, the flange comprises a triangular shaped body with a tubular extension 60 that receives an associated one of the first 14 and second 16 ends. The tubular extension 60 is welded to the axle tube 12 at a weld attachment interface that is schematically indicated at 62 (FIG. 2A).

The attachment member 50 is a unitary component that includes both the spindle attachment interface 52 and the brake attachment interface 54. In one example, the spindle attachment interface 52 comprises a plurality of openings 64 that are circumferentially spaced apart from each other about a central axis 66 defined by a center opening that receives the tube 12. Fasteners 68 are inserted into the openings 64 to mount the spindle 56 to the attachment member 50 at the spindle attachment interface 52.

In the example shown, the spindles 56 each have a flange portion 56a (FIG. 4) that includes a plurality of openings 56b. While a scalloped profile is shown for the flange portion 56a, other profiles could also be used depending upon available packaging space and strength/weight requirements. The openings 56b in the flange portion 56a are aligned with the openings 64 in the attachment member 50. The fasteners 68 extend through the aligned openings 56b, 64 to secure the spindle 56 to the attachment member 50. A cylindrical body portion 56c of the spindle 56 extends outwardly from the flange portion 56a to support the hub 22 for rotation about the axis 66.

In the example for the disc brake assembly, the brake attachment interface 54 comprises an enlarged mounting boss area that includes a first set of openings 70 positioned on one side of the tubular extension 60 and a second set of openings 72 positioned on an opposite side of the tubular extension 60. The enlarged mounting boss area has a greater thickness than a thickness of the flange at the spindle attachment interface. The first 70 and second 72 sets of openings are spaced apart from each other along an axis 74 that extends in a generally linear direction. Fasteners 76 are inserted into the openings 70, 72 to mount the caliper 24 to the attachment member 50 at the brake attachment interface 54. Thus, as shown in FIGS. 1-4, the attachment member 50 provides a common mounting interface for attachment and detachment of spindle and disc brake structures for serviceability and interchangeability.

Figure 6:
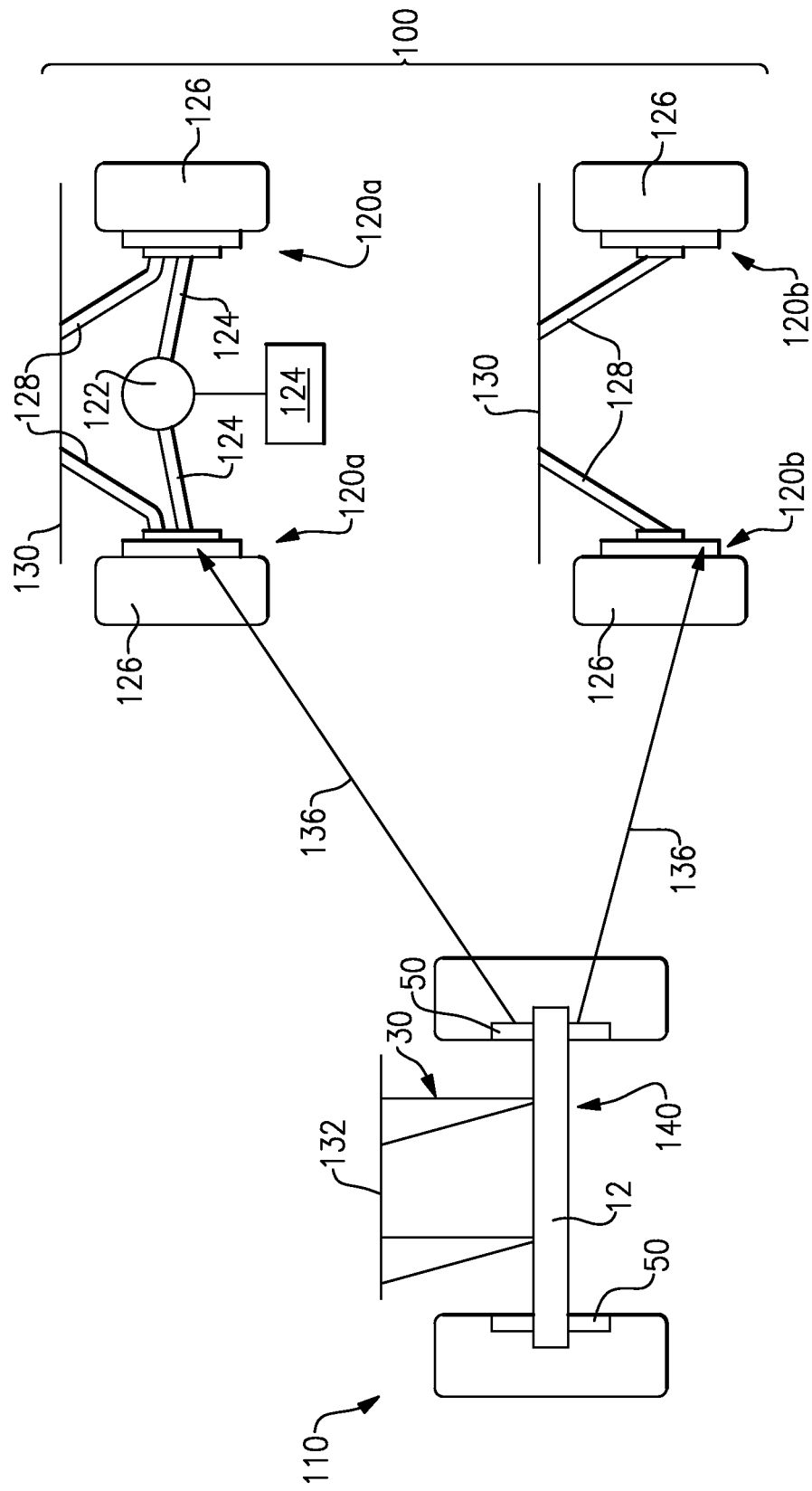
FIG. 6 is a schematic representation of an interchangeable spindle being removed from a trailer axle to either of independently suspended non-drive wheel ends or independently suspended driven wheel ends.

An example of this interchangeability is shown in FIGS. 5-6. FIG. 5 shows a vehicle comprising a truck or prime mover unit 100 powered by an internal combustion engine or electric motor, and which pulls a trailer unit 110. The prime mover unit 100 includes prime mover wheel assemblies 120a, 120b that are connected to a chassis or frame of the truck 100 via a suspension assembly. Any type of suspension can be used to connect the wheel assemblies 120a, 120b and vehicle frame. In one example, the suspension comprises an independent suspension that allows independent articulation at each wheel. The trailer unit 110 includes one or more trailer axle assemblies 140 that are connected to the frame or chassis of the trailer unit 110 via a suspension system. Any type of suspension can be used to connect the trailer axle and trailer frame, such as the suspension system 30 shown in FIG. 1, for example.

Each of the prime mover assemblies 120a, 120b and/or trailer axle assemblies 140 is configured to receive the detachable spindle, as described above, to provide complete interchangeability. For example, when the rigid axle assembly 10 is utilized for one of the trailer axle assemblies 140 of the trailer unit 110, the spindle 56 can be detached from the trailer axle assembly 140 and can be attached to the prime mover wheel assemblies 120a, 120b as needed. Also, the reverse operation can be performed where a spindle from a prime mover wheel assembly 120a, 120b can be used on a trailer axle assembly 140; however, this reverse operation is not necessary. Thus, as indicated by the arrows 150 in FIG. 5, the attachment member 50 allows spindle interchangeability throughout the entire vehicle.

The prime mover unit 100 will include at least one laterally spaced pair of wheel assemblies that are driven by a power source. Any remaining pairs of prime mover wheel assemblies can be driven or non-driven. In the example shown in FIGS. 5 and 6, the wheel assemblies 120a are driven wheels that are connected to a vehicle frame 130 via an independent suspension 128. A differential 122 receives driving input from a power source 124 such as an engine or electric motor for example, and provides driving output to independent wheel shafts 124 which are configured to drive laterally opposed wheels 126. The independent suspension assembly 128 connects each wheel independently to the frame or chassis 130. The other wheel assemblies 120b can be similarly configured, or can be a non-drive configuration, for example. Optionally, instead of being mounted with independent suspensions, the wheel assemblies 120a, 120b could be mounted to a rigid axle housing as part of a drive or non-drive axle.

As schematically shown in FIG. 6, the trailer axle assembly 140 comprises a rigid non-drive axle such as that shown in FIG. 1, for example. The suspension 30 connects the rigid tube 12 to a trailer frame 132. An attachment member 50 is mounted to at least one axle end and includes a spindle attachment and brake attachment as described above. In the example shown, one attachment member is attached to each axle end. If a spindle on one of the wheel assemblies 120a, 120b becomes damaged, a spindle from the trailer axle assembly 140 can be removed and used to replace the damaged spindle on the prime mover unit as indicated by arrows 136. In an independent suspension configuration such as that shown in FIG. 6, the trailer spindle would be detached from the attachment member and would be re-attached to a knuckle or other wheel structure when installed on the prime mover unit.

As discussed above, the example shown in FIG. 1 comprises a trailer axle with a disc brake assembly. However, the attachment member can be used with other types of axles and other types of brakes, which will be discussed in greater detail below. In each of these additional examples, the attachment member includes a spindle attachment interface and a brake component attachment interface; however, the attachment member is re-configured as needed to accommodate the different components associated with the different axle and brake types.

Figure 7:
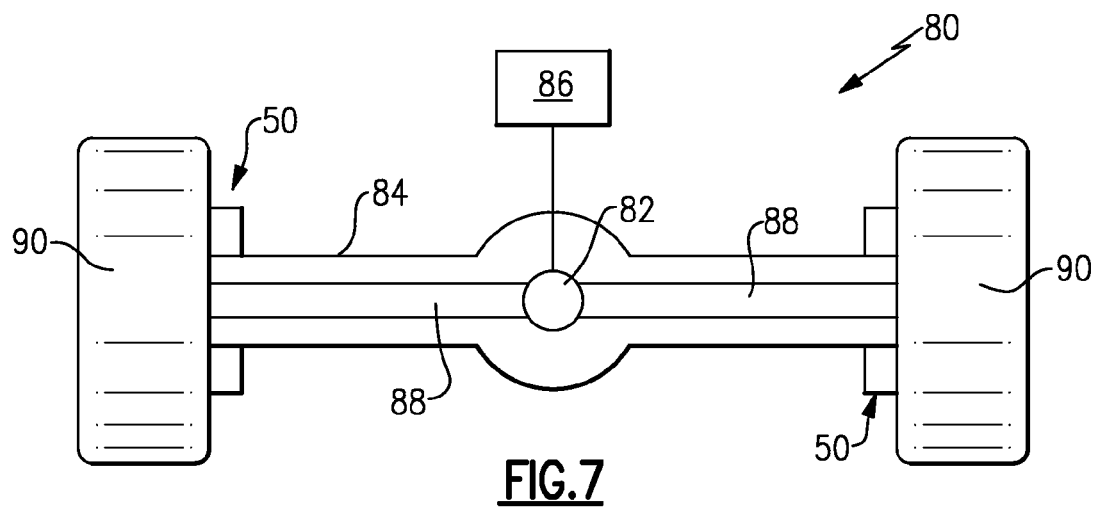
FIG. 7 is a schematic representation of a rigid drive axle incorporating an attachment member for a spindle and brake assembly.

FIG. 7 schematically shows one example of a rigid drive axle assembly 80 that utilizes the attachment member 50. The drive axle 80 includes a differential 82 mounted within an axle housing 84 that extends between first and second housing ends. The differential 82 receives input from a driving power source 86, such as a combustion engine or electric motor, for example. The differential 82 is configured to drive axle shafts 88 that are configured to drive wheel assemblies 90. The attachment member 50 is attached to the axle housing 84 at each axle housing end. The attachment member 50 comprises a flange with a spindle attachment interface and brake attachment interface as described above. FIG. 7 shows one example drive axle configuration, it should be understood that other drive axle assemblies could also utilize the attachment member.

Figure 8A:
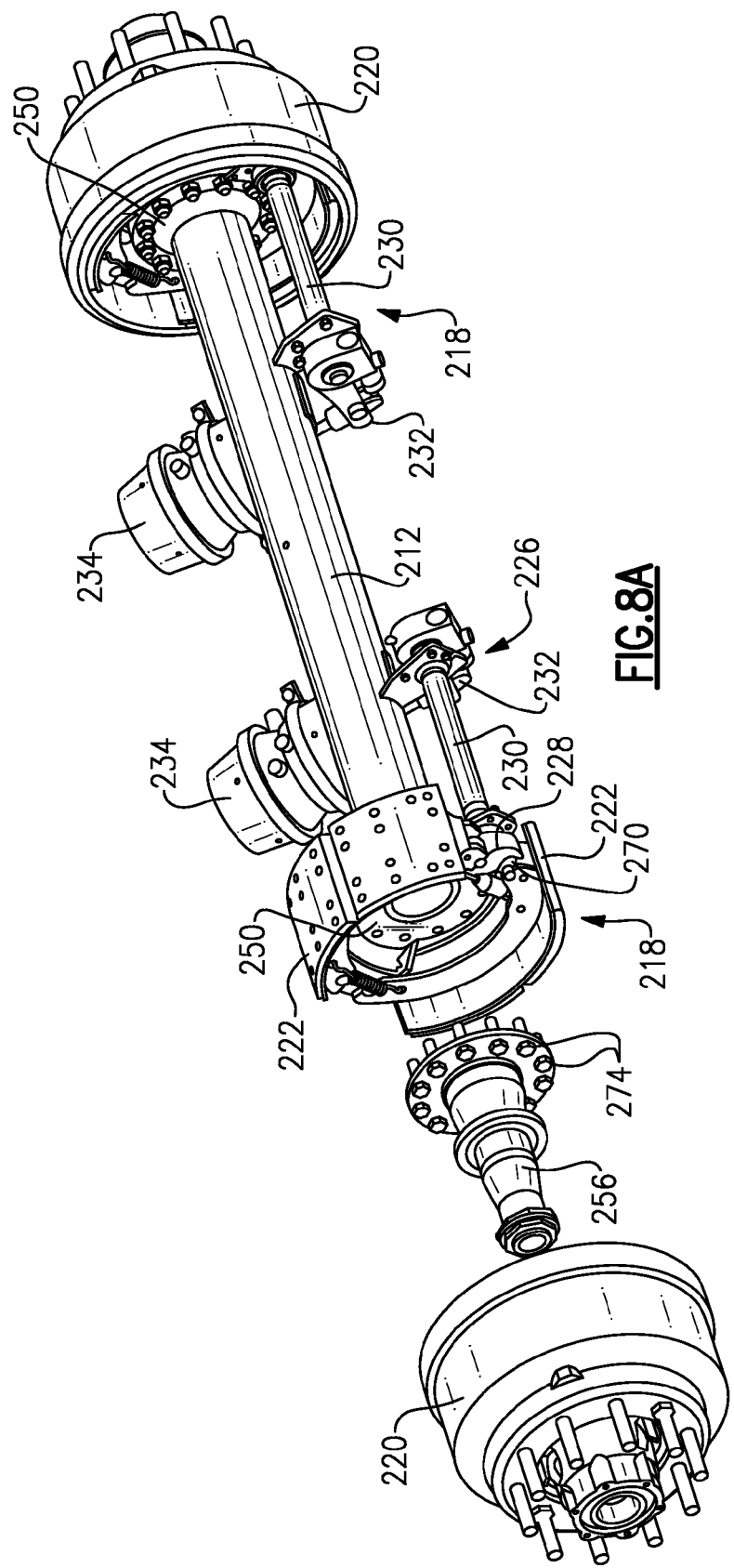
FIG. 8A is another example of a rigid axle assembly utilizing an attachment member to provide a serviceable spindle with a cam actuated drum brake assembly.
Figure 8C:
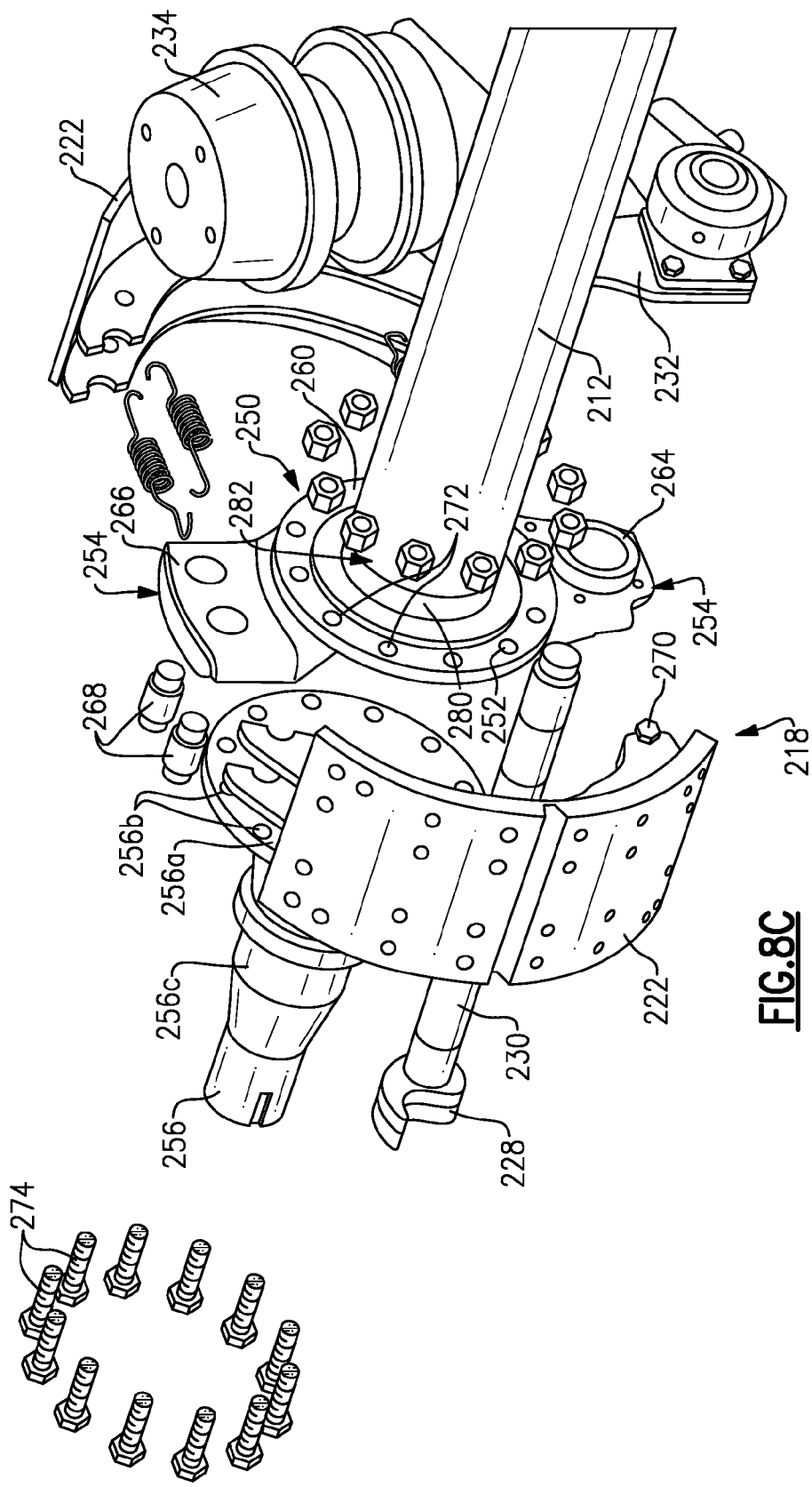
FIG. 8C shows an exploded view of one end of the axle assembly of FIG. 8A, as looking at an inboard face of the attachment member.

FIGS. 8A-8C shows a configuration that uses a cam actuated drum brake assembly 218 instead of a disc brake assembly. In this configuration an attachment member 250 includes a spindle attachment interface 252 for a spindle 256 and a brake attachment interface 254 for a non-rotating component of the drum brake assembly 218. The drum brake assembly 218 includes a brake drum 220 that is mounted for rotation with the wheel hub 22. The drum brake assembly 218 also includes a pair of brake shoes 222 supported by a non-rotating brake spider that is formed as part of the attachment member 250. An actuation mechanism 226 comprises an s-cam head 228 coupled to a camshaft 230, and which is rotated via a lever assembly 232 connected to an air chamber 234. In response to a brake request, the camshaft 230 rotates the s-cam 228 which pushes the brake shoes 222 radially outward into engagement with an inner surface of the rotating brake drum 220 to brake the associated wheel.

As shown in FIGS. 8B and 8C, the attachment member 250 comprises a flange body 260 including a central opening 262 that receives an axle housing or tube 212. A cam shaft mount boss 264 is formed on one side of the flange body 260 and includes an opening to receive the camshaft 230. An anchor pin mounting boss 266 is formed on an opposite side of the flange body 260 and includes openings to receive anchor pins 268 that are coupled to one end of the brake shoes 222. The cam shaft mount boss 264 and the anchor pin mounting boss 266 comprise enlarged areas that have a greater thickness than the flange body 260 at the spindle attachment interface 252.

Brake shoe rollers 270 are associated with opposite ends of the brake shoes 222. The s-cam head 228 reacts against the brake shoe rollers 270 to force the brake shoes into engagement with the brake drum 220. The cam shaft mount boss 264 and anchor pin mount boss 266 comprise the brake attachment interface 254. Thus, the attachment member 250 comprises an integrated brake spider to which the non-rotating brake shoe components are attached.

The attachment member 250 includes a plurality of mounting holes 272 formed about the central opening 262. Fasteners 274 are received within the mounting holes 272 to secure the spindle 256 to the attachment member 250 at the spindle attachment interface 252.

The spindle 256 includes a flange portion 256a with a plurality of openings 256b that are aligned with the mounting holes 272. The fasteners 274 extend through the aligned openings 256b, 272 to secure the components together. The spindle includes a cylindrical body portion 256c that extends outwardly to support bearings as shown in FIG. 2.

The attachment member 250 includes a tubular extension 280 formed about the central opening 262 that is slid over the axle tube 212. The attachment member is welded to the tube 212 as indicated at 282 in FIG. 8C.

Figure 9A:
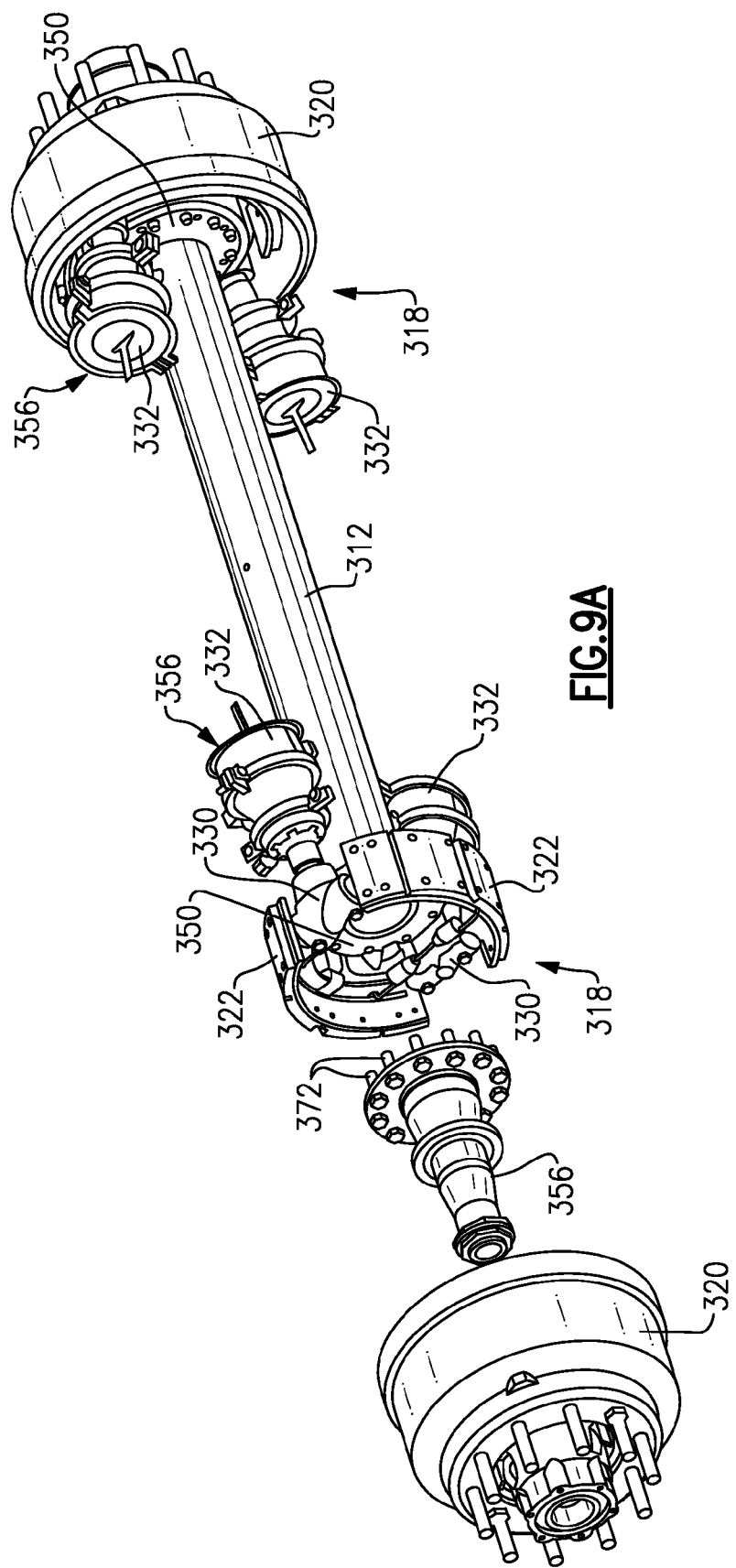
FIG. 9A is another example of a rigid axle assembly utilizing an attachment member to provide a serviceable spindle with a wedge actuated drum brake assembly.
Figure 9B:
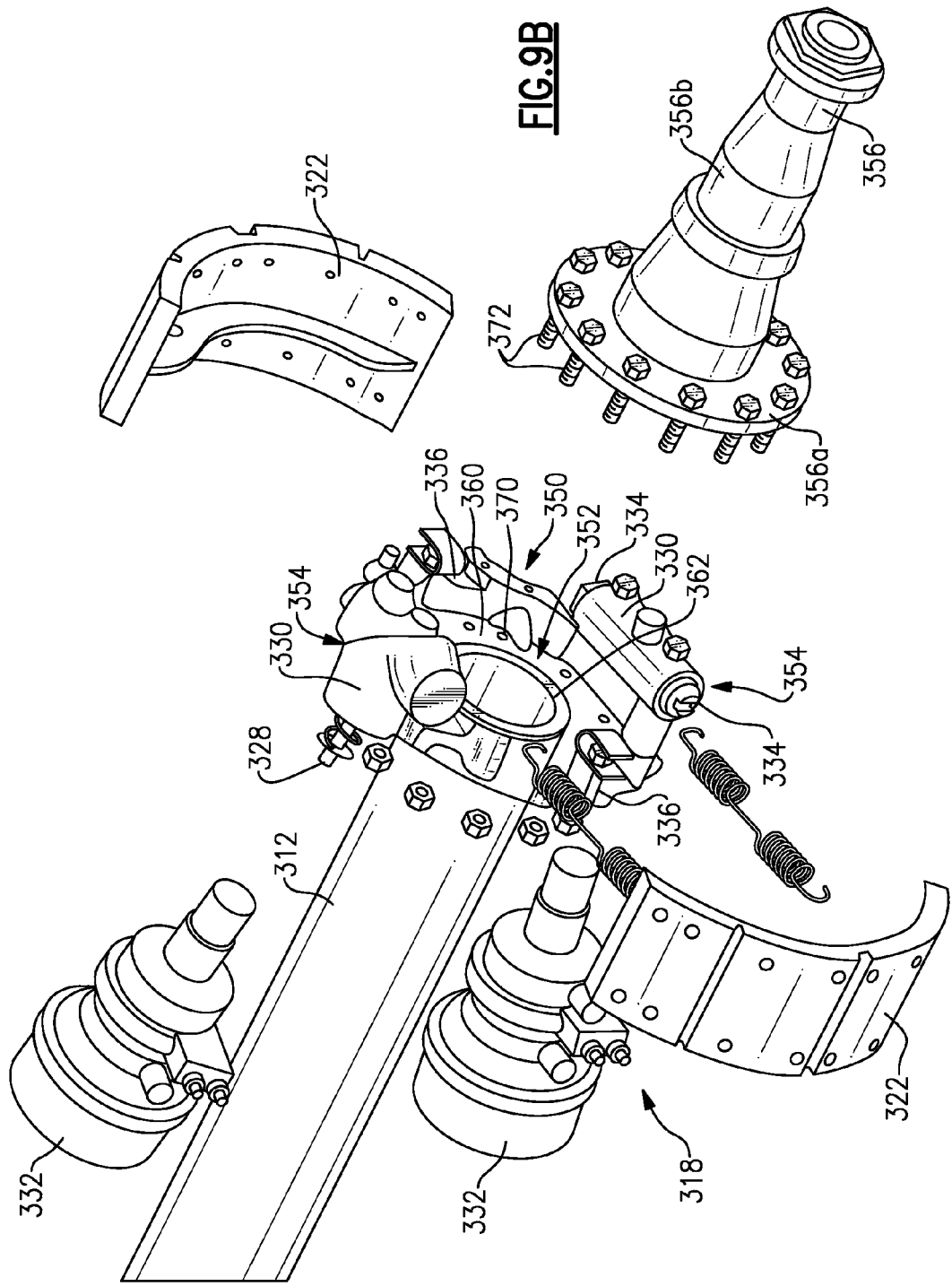
FIG. 9B shows an exploded view of one end of the axle assembly of FIG. 9A, as looking at an outboard face of the attachment member.
Figure 9C:
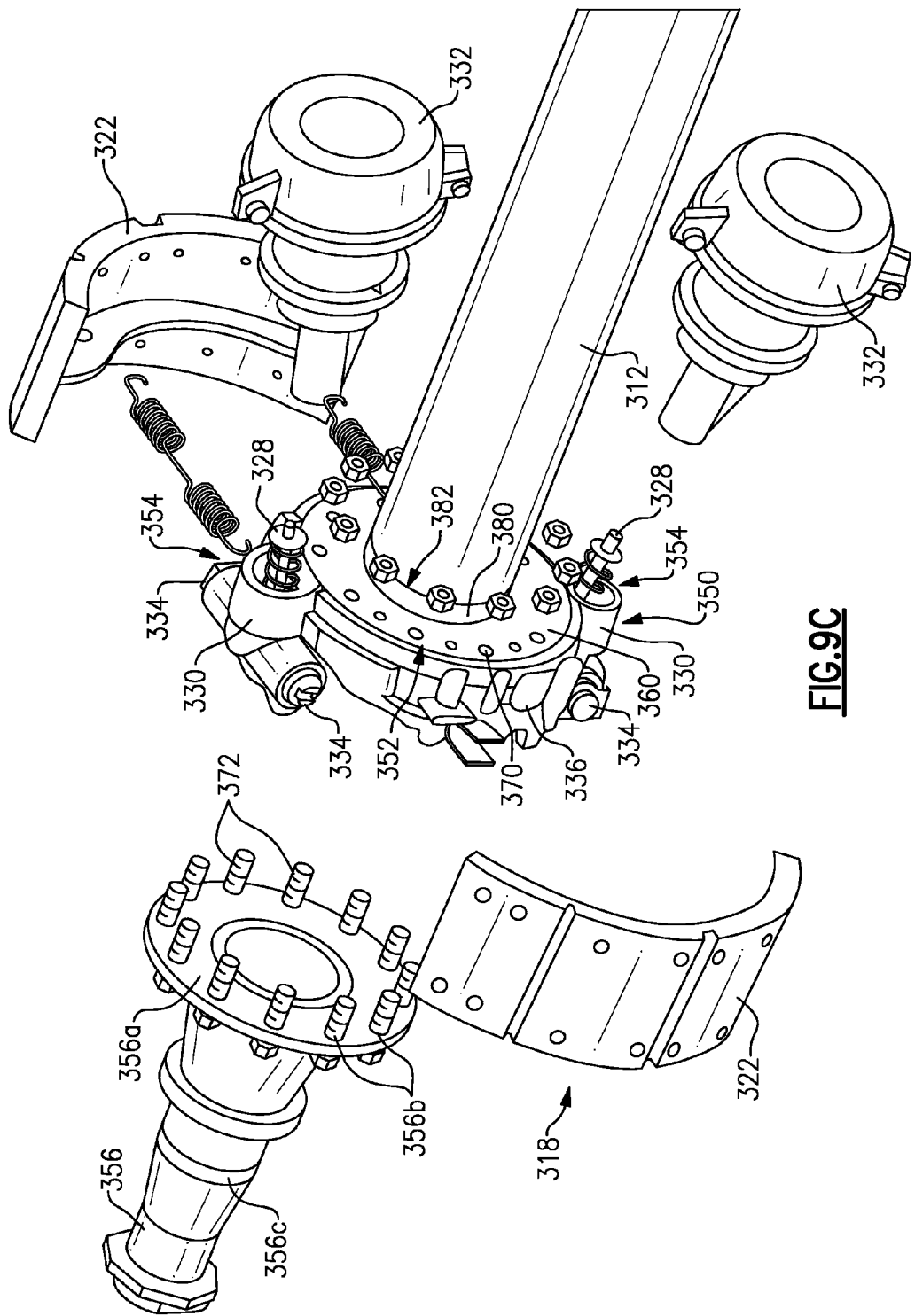
FIG. 9C shows an exploded view of one end of the axle assembly of FIG. 9A, as looking at an inboard face of the attachment member.

FIGS. 9A-9C shows a configuration that uses a wedge actuated drum brake assembly 318 instead of a disc brake assembly. In this configuration an attachment member 350 includes a spindle attachment interface 352 for a spindle 356 and a brake attachment interface 354 for non-rotating brake component of the drum brake assembly. The drum brake assembly 318 includes a brake drum 320 that is mounted for rotation with the wheel hub 22. The drum brake assembly 318 also includes a pair of brake shoes 322 supported by a non-rotating brake spider that is formed as part of the attachment member 350. An actuation mechanism 326 comprises a wedge assembly 328 mounted within a spider housing 330, and which is actuated via an air chamber 332. The wedge assembly 328 includes a wedge-shaped head (not shown) that forces plungers 334 apart to apply the brakes. In response to a brake request, the air chamber 332 actuates the wedge assembly 328 such that the plungers 334 push the brake shoes 322 radially outward into engagement with an inner surface of the rotating brake drum 320 to brake the associated wheel.

As shown in FIGS. 9B and 9C, the attachment member 350 comprises a flange body 360 including a central opening 362 that receives an axle housing or tube 312. The spider housing 330 is integrally formed as part of the attachment member 350. In the example configuration, the attachment member includes two integrally formed spider housings 330; however, certain applications may only require one spider housing. One wedge assembly is positioned in each housing 330 and each wedge assembly is actuated by a dedicated air chamber 332. The attachment member 350 also includes enlarged mounting boss areas 336 for connection to the brake shoes 322. The mounting boss areas 336 have a greater thickness than the flange body 360 at the spindle attachment interface 352. The spider housing 330 and mounting boss areas 336 comprise the brake attachment interface 354. Thus, the attachment member 350 comprises an integrated brake spider to which the non-rotating brake shoe components are attached.

The attachment member 350 includes a plurality of mounting holes 370 formed about the central opening 362. Fasteners 372 are received within the mounting holes 370 to secure the spindle 356 to the attachment member 350 at the spindle attachment interface 352.

The spindle 356 includes a flange portion 356a with a plurality of openings 356b that are aligned with the mounting holes 370. The fasteners 372 extend through the aligned openings 356b, 370 to secure the components together. The spindle includes a cylindrical body portion 356c that extends outwardly to support bearings as shown in FIG. 2.

The attachment member 350 includes a tubular extension 380 formed about the central opening 362 that is slid over the axle tube 312. The attachment member is welded to the tube 312 as indicated at 382 in FIG. 9C.

It should be understood that the attachment members 50, 250, 350 can be used with any type of axle. Further, the attachment members 50, 250, 350 can be used with axles mounted with different types of suspensions. For example, the rigid non-drive axle of FIG. 1 can be configured with any of the attachment members such that any type of brake assembly can be used. Similarly, the drive axle shown in FIG. 7 can also use any of the different attachment members. Further, the wheels 120a, 120b with the independent suspensions for the vehicle shown in FIGS. 5-6 can be configured to accept any of the attachment members 50, 150, 250 to accommodate the different types of brakes.

Although an embodiment of this invention has been disclosed, a worker of ordinary skill in this art would recognize that certain modifications would come within the scope of this invention. For that reason, the following claims should be studied to determine the true scope and content of this invention.

What is claimed is:
1. A vehicle comprising:
a prime mover unit including at least one prime mover wheel assembly having a prime mover spindle; and a trailer unit including at least one trailer wheel assembly having a trailer spindle, wherein the trailer spindle is configured to be detachable from the trailer wheel assembly and attached to the prime mover wheel assembly, wherein the at least one trailer wheel assembly comprises first and second trailer wheel assemblies mounted to laterally opposed ends of a trailer axle, the trailer axle including an axle having first and second axle ends, at least one attachment member associated with one of the first and second axle ends, the attachment member comprising a flange that includes a spindle attachment interface and a brake attachment interface, and wherein one trailer spindle is attached to the flange at the spindle attachment interface, the spindle attachment interface comprising a detachable connection that allows the trailer spindle to be selectively attached and detached from the axle.

2. The vehicle according to claim 1 wherein the flange includes a tubular extension that receives an associated one of the first and second axle ends.

3. The vehicle according to claim 1 wherein the attachment member includes a central opening that receives the axle, and wherein the spindle attachment interface comprises a plurality of openings circumferentially spaced apart from each other about a central axis defined by the central opening, the plurality of openings configured to receive fasteners to mount the trailer spindle to the flange at the spindle attachment interface.

4. The vehicle according to claim 3 wherein the attachment member includes at least one enlarged mounting boss with a plurality of holes to define the brake attachment interface, and wherein the holes are configured to receive fasteners to mount a brake component to the attachment member.

5. The vehicle according to claim 1 wherein the at least one attachment member comprises a first attachment member associated with the first axle end and a second attachment member associated with the second axle end, and wherein one trailer spindle is mounted to each of the first and second attachment members at the respective spindle attachment interface.

6. A vehicle comprising:

a prime mover unit including at least one prime mover wheel assembly having a prime mover spindle; and a trailer unit including at least one trailer wheel assembly having a trailer spindle, wherein the trailer spindle is configured to be detachable from the trailer wheel assembly and attached to the prime mover wheel assembly, wherein the prime mover wheel assembly is independently suspended from a vehicle frame, and wherein the trailer spindle is configured for detachment from a trailer spindle attachment interface on the trailer wheel assembly and is configured for attachment to a prime mover spindle attachment interface on the prime mover wheel assembly.

7. A method of assembling spindles on a vehicle comprising the steps of:

(a) providing a prime mover unit with a prime mover wheel assembly including a prime mover spindle;

(b) providing a trailer unit with a trailer wheel assembly including a trailer spindle, attaching an attachment member to the trailer wheel assembly, the attachment member including a spindle attachment interface and a brake attachment interface; attaching the trailer spindle to the attachment member at the spindle attachment interface; attaching a brake component to the attachment member at the brake attachment interface; and attaching an attachment member to the trailer wheel assembly;

(c) removing the trailer spindle from the trailer wheel assembly and removing the prime mover spindle from the prime mover wheel assembly; and (d) replacing the prime mover spindle with the trailer spindle, wherein steps (c) and (d) are performed subsequently to step (b).

8. A vehicle comprising:

a prime mover unit including at least one prime mover wheel assembly having a prime mover spindle; and a trailer unit including at least one trailer wheel assembly having a trailer spindle, the at least one trailer wheel assembly including first and second trailer wheel assemblies mounted to laterally opposed ends of a trailer axle, the trailer axle including an axle having first and second axle ends and at least one attachment member associated with one of the first and second axle ends, the attachment member including a spindle attachment interface, wherein the attachment member includes a central opening that receives the axle, and wherein the spindle attachment interface comprises a plurality of openings circumferentially spaced apart from each other about a central axis defined by the central opening, the plurality of openings configured to receive fasteners to mount the trailer spindle, wherein one trailer spindle is attached to the spindle attachment interface, the spindle attachment interface comprising a detachable connection that allows the trailer spindle to be detachable from the trailer wheel assembly and attached to the prime mover wheel assembly.

* * * * *